Feb. 18, 1958  B. L. BINFORD  2,824,186
FLUID PRESSURE ACTUATOR
Filed July 18, 1955
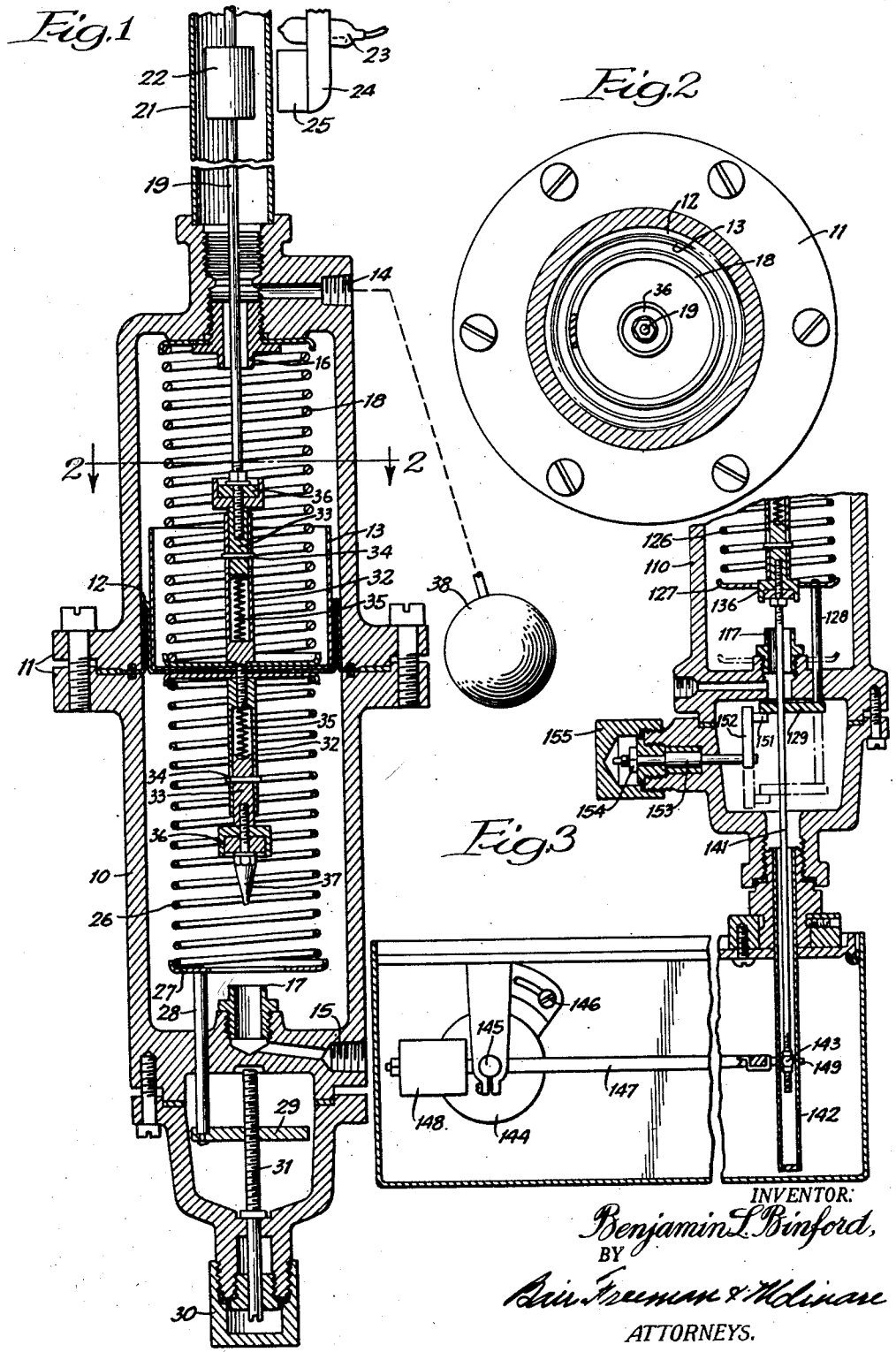
INVENTOR:
Benjamin L. Binford,
BY
ATTORNEYS.

United States Patent Office 2,824,186
Patented Feb. 18, 1958

2,824,186

FLUID PRESSURE ACTUATOR

Benjamin L. Binford, Elmwood Park, Ill., assignor to Magnetrol, Inc., Chicago, Ill., a corporation of Illinois Application July 18, 1955, Serial No. 522,475

8 Claims. (Cl. 200—83)

This invention relates to a fluid pressure actuator and more particularly to a mechanism responsive to variations in a fluid pressure to effect an indicating or controlling operation.

It is one of the objects of the present invention to provide a fluid pressure actuator in which variations of pressure act on a flexible diaphragm to move it and movement of the diaphragm is sensed magnetically to operate a control device.

Another object is to provide an actuator in which the diaphragm is urged in one direction by fluid pressure opposed directly by a main or range change spring and urged in said one direction by a zero adjusting spring which can be adjusted to adjust the zero setting of the actuator.

Still another object is to provide an actuator in which the fluid pressure connections are closed as the diaphragm approaches the limits of its travel in either direction thereby to prevent rupture of the diaphragm due to excessive pressure.

According to one feature, the pressure connections to the actuator are through valve seats which are closed by valve members connected to the diaphragm through lost motion means so that the diaphragm can have a limited movement after seating of the valve to compress fluid trapped in the actuator by closing of the valve.

A further object is to provide a fluid pressure actuator in which the diaphragm is urged in one direction by a variable fluid pressure to be measured and in the opposite direction by the pressure in a closed constant volume system to effect a proportional or progressive control.

The above and other objects and features of the invention will be more readily apparent from the following description when read in connection with the accompanying drawing, in which:

Figure 1 is a sectional view through a fluid pressure actuator embodying the invention;

Figure 2 is a transverse section on the line 2—2 of Figure 1; and

Figure 3 is a partial section showing an alternative construction.

The actuator, as shown, comprises an elongated tubular housing 10 which may be formed of two parts connected together near their center through flanges 11. The flanges may clamp between them the edges of a flexible diaphragm 12 mounted within the housing and separating the ends thereof from each other. The diaphragm may be connected at its central portion to a cup-shaped diaphragm follower 13 which is smaller than the internal diameter of the housing so that the diaphragm may curl between the follower and the housing walls, as shown. In this way, the diaphragm can have a very substantial longitudinal movement while maintaining a substantially constant effective area.

The diaphragm is adapted to respond to the difference between pressures supplied to the housing through taps 14 and 15 at the opposite ends thereof. The taps communicate with the opposite ends of the housing through axial valve seats 16 and 17. The pressures to which the diaphragm responds may be any desired pressures which are to be measured with the higher pressure being supplied through the tap 15. By way of example, the tap 14 may be supplied with a static pressure in a tank or system while the tap 15 is supplied with a higher working pressure representative of flow, temperature, or other values superimposed on the static pressure.

The diaphragm is urged toward the tap 15 by a range spring 18 seating at one end of the housing and against the differential pressure across the diaphragm so that the diaphragm and follower will take a position representative of the value of the differential pressure to effect an indicating or control operation in response to variations in the differential pressure.

According to one feature of the invention, the movements of the diaphragm are detected magnetically to effect the desired indicating or control operation. For this purpose, an actuating rod 19 is operatively connected to the diaphragm, as explained more fully hereinafter, and extends through the valve seat 16 into a non-magnetic tube 21 supported at the end 14 of the housing. The rod 19 carries a magnetic armature 22 within the tube which will be moved lengthwise of the tube as the diaphragm moves. Preferably, the outer end of the tube 21 is sealed closed so that no pressure seals for the rod 19 are required. The magnetic element 22 operates a control device shown as a tiltable mercury switch 23 mounted on a lever 24 which is pivoted on a horizontal axis adjacent to the tube 21. The lever 24 is normally biased away from the tube to hold the switch 23 in one control position and will be moved toward the tube by a magnet 25 carried by the lever when the armature 22 is in registry with the magnet, as shown. As the diaphragm moves to shift the armature 22, the magnetic mechanism illustrated will operate the control device 23 to effect a desired indicating or control operation. It will be apparent that, if desired, a plurality of control devices could be positioned at spaced points along the tube 21 to be operated successively as the diaphragm moves.

According to one feature of the invention, the zero position of the diaphragm is adjusted by a zero setting spring 26 seating against the diaphragm in opposition to the spring 18. The spring 26 rests against an adjustable collar 27 in the end 15 of the housing which is supported by a plurality of rods 28 extending through the end of the housing and carried by a disc 29. The disc 29 is supported by threaded engagement with a screw 31 extending rotatably through the end of the housing and covered by a cap 30 threaded onto the end of the housing so that when the screw 31 is turned, the disc 29 will be shifted longitudinally of the housing to change the setting of the spring 26. The initial compression of the spring 26 will determine the neutral or zero position occupied by the diaphragm 12 when there is no pressure across it and will thus determine the zero adjustment of the actuator. By removing the cap the spring 26 can easily be adjusted from the outside of the housing without requiring any disconnection or shut off of pressure.

In order to prevent damage to the diaphragm in the event of excessive pressure conditions, such as might occur on a loss of pressure in one of the connections to the actuator or an excessive operating pressure, means are provided to close the connections to the housing near the limits of movement of the diaphragm. For this purpose, the diaphragm carries valve members which will seat against the seats 16 and 17 near the limits of travel of the diaphragm. As shown, the diaphragm carries tubular sleeves 32 projecting from opposite sides thereof in which rods 33 are slidable. The rods 33 carry pins 34 extending through elongated slots in the tubes to limit axial movement of the rods in the tubes and springs 35 are provided to urge the rods outward of the tubes. At their outer ends the rods 33 carry valve elements 36 to seat against the seats 16 and 17, respectively.

The upper valve element 36 has the actuating rod 19 secured thereto, as shown, so that movement of the actuating rod will be limited by engagement of the valve 36 with the seat 16. In this way, the magnetic sensing means may be made of minimum size to accommodate only the desired working stroke of the diaphragm with any excessive movement of the diaphragm after seating of the valve not being transmitted to the armature 22. The lower valve 36 may carry a conical pilot member 37 to enter the seat 17 and insure proper centering of the valve with respect thereto.

Assuming that an excessive pressure is supplied to the tap 15, the upper valve 36 will seat on the seat 16 after the diaphragm has reached the limit of its normal working stroke. If the pressure is sufficient to move the diaphragm further against the spring 18, the fluid trapped in the housing above the diaphragm will be compressed as the spring 35 yields to maintain the fluid pressure on opposite sides of the diaphragm substantially equal. Thus rupture of the diaphragm due to excessive differential pressure thereacross is prevented. In the event the pressure below the diaphragm decreases excessively, as for example, due to breaking of a supply connection, the lower valve 36 will seat on the seat 17, trap fluid beneath the diaphragm and prevent rupture thereof in the same manner.

According to one desirable system in which the actuator may be employed where only a single pressure is to be measured, the tap 14 may be connected to a closed fluid system of constant volume furnished, for example, by a closed ball 38 connected in closed communication with the tap 14. In this system, the range spring 18 may be employed or may be omitted, as desired. As the diaphragm is moved upward by pressure supplied through the tap 15, the fluid within the closed system 38 will be compressed to increase the pressure acting downward on the diaphragm so that the diaphragm will be moved to a position representative of the value of the pressure supplied through the tap 15. Thus a proportional control can be provided simply and without the use of springs, if this be desired.

Figure 3 illustrates a modification wherein indicating or control devices are operated at both ends of the housing. Parts in Figure 3 corresponding to like parts in Figures 1 and 2 are indicated by the same reference numerals, plus 100.

In this construction, the upper end of the housing and the control mechanism 21—25 may be identical to that shown in Figure 1 and is not again illustrated. An additional indicating or control device is, however, provided at the lower end of the housing to produce an indicating or control operation in addition to that produced by the mechanism 21—25. As shown, a rod 141 is attached to the lower valve member 136 and extends through the valve seat 117 in the same manner as the rod 19 extends through the upper valve seat 16. The rod 141 projects into a closed tube 142 of non-magnetic material which is secured to the closed lower end of the housing in fluid tight relation, as shown. Within the tube 142, the rod 141 carries a magnetic armature 143 which will be shifted vertically in the tube as the diaphragm moves.

The armature 143 is adapted to operate an indicating or control apparatus which in the construction shown is of the proportional type. This apparatus, as shown, comprises a variable rheostat or potentiometer 144 including a circular casing adjustably mounted about an axis 145 by means of a screw and slot connection 146. The potentiometer includes a rotary wiper rotatable about the axis 145 and connected to an arm 147 which may be counterweighted, as shown at 148. At its free end, the arm carries an U-shaped magnet 149 which spans the tube 142 so that it will always lie opposite to the armature 143. In this way, the arm is turned to a position corresponding precisely to the position of the diaphragm and the potentiometer can produce a voltage proportional to the value of the pressure acting on the diaphragm.

To adjust the zero adjustment spring 126, the lower ends of the guide rods 128 for the spring seat 127 are connected to the disc 129 which has an opening in its center through which the rod 141 passes freely. The position of the disc 129 is determined by a crank pin 151 which rests against the lower surface of the disc and which is carried by a crank arm 152 on a rotatable shaft 153. The shaft 153 is sealed in the housing and extends laterally therefrom to terminate in a threaded end portion to receive a lock nut 154. The end of the shaft may be enclosed and sealed by a removable cap 155.

To adjust the zero spring with this construction the cap 155 is removed, the lock nut is released and the shaft is turned to produce a desired shifting adjustment of the disc 129. When the disc 129 is in position to produce the desired tension on the spring 126, the lock nut 154 may be tightened to hold the shaft in position and the cap 155 may be secured to the body. The operation of the arm shown in Figure 3 is identical to that of Figures 1 and 2 except that two indicating or control operations are performed simultaneously through separate control devices at the opposite ends of the housing.

While two embodiments of the invention have been shown and described herein, it will be understood that they are illustrative only and are not to be taken as a definition of the scope of the invention, reference being had for this purpose to the appended claims.

What is claimed is:

1. A fluid pressure actuator comprising an elongated tubular housing adapted to be connected adjacent its opposite ends to sources of reference fluid pressure and fluid pressure to be measured respectively, a flexible diaphragm in the housing intermediate its ends to be urged in one direction by the difference in the fluid pressures, a spring in the housing urging the diaphragm in the other direction, a zero adjusting spring in the housing urging the diaphragm in said one direction and being weaker than the first named spring, means to adjust the adjusting spring thereby to adjust the zero setting of the actuator, and control means operated by movement of the diaphragm.

2. A fluid pressure actuator comprising an elongated tubular housing, fluid pressure connections to the opposite ends of the housing terminating in axially facing valve seats in the housing, said valve seats constituting the sole fluid passages into the opposite ends of the housing, a flexible diaphragm in the housing between the valve seats, impervious valve members to seat on the valve seats respectively, and lost motion means connecting the valve members to the diaphragm to cause one of the valve members to seat on the corresponding seat before the diaphragm reaches its limit of travel in either direction, further movement of the diaphragm in the same direction compressing fluid trapped in the end of the housing by seating of the valve member and control means operatively connected to one of the valve members to be operated by movement thereof.

3. A fluid pressure actuator comprising an elongated tubular housing, fluid pressure connections to the opposite ends of the housing terminating in axially facing valve seats in the housing, said valve seats constituting the sole fluid passages into the opposite ends of the housing, a flexible diaphragm in the housing between the valve seats, impervious valve members carried by the diaphragm to seat on the seats respectively as the diaphragm approaches the limits of its travel in opposite directions thereby to prevent rupture of the diaphragm, an operating rod secured to one of the valve members and projecting through the adjacent seat, and control means at the same end of the housing as the last named seat operated by movement of the rod.

4. A fluid pressure actuator comprising an elongated tubular housing, fluid pressure connections to the opposite ends of the housing terminating in axially facing valve seats in the housing, said valve seats constituting the sole fluid passages into the opposite ends of the housing, a flexible diaphragm in the housing between the valve seats, impervious valve members to seat on the valve seats respectively, lost motion means connecting the valve members to the diaphragm, an operating rod secured to one of the valve members and projecting through the adjacent seat, and control means at the same end of the housing as the last named seat operated by movement of the rod.

5. A fluid pressure actuator comprising an elongated tubular housing, a flexible diaphragm in the housing intermediate its ends, control means connected to the diaphragm to be operated by movement thereof, a connection from one end of the housing to a source of variable fluid pressure to be measured, and a closed fluid pressure system of constant volume connected to the other end of the housing.

6. A fluid pressure actuator comprising an elongated tubular housing having axial openings at its ends for connection to sources of reference fluid pressure and fluid pressure to be measured respectively, a flexible diaphragm in the housing intermediate its ends to be urged in one direction by the difference in the fluid pressures, a spring in the housing urging the diaphragm in the opposite direction, closed non-magnetic tubes extending from the ends of the housing in registry with the openings therein, rods extending from opposite sides of the diaphragm into the tubes respectively, magnetic elements carried by the rods for sliding in the tubes as the diaphragm moves, and control devices mounted outside of the tubes respectively and each including a magnetic element complementary to the first named elements to be moved to different positions as the first named magnetic elements shift in the tubes.

7. The construction of claim 6 in which one of the control devices is an electric switch movable between two distinct positions and the other control device is a proportional controller whose magnetic element follows the movements of the corresponding first named magnetic element.

8. A fluid pressure actuator comprising an elongated tubular housing, fluid pressure connections to the opposite ends of the housing terminating in inwardly facing axial valve seats, a flexible diaphragm in the housing intermediate its ends, valve members to seat on the valve seats respectively, lost motion means connecting the valve members to the diaphragm, operating rods secured to the valve members and extending through the valve seats respectively, and a pair of control devices at the ends of the housing operated by movement of the rods respectively.

References Cited in the file of this patent

UNITED STATES PATENTS

| | | |
|---|---|---|
| 917,642 | McElroy | Apr. 6, 1909 |
| 970,951 | Reubold | Sept. 20, 1910 |
| 1,509,998 | Geiger et al. | Sept. 30, 1924 |
| 1,604,548 | Dapron | Oct. 26, 1926 |
| 2,005,583 | Hampton et al. | June 18, 1935 |
| 2,064,864 | Temple | Dec. 22, 1936 |
| 2,456,994 | Robison | Dec. 21, 1948 |
| 2,503,089 | Binford | Apr. 4, 1950 |
| 2,527,814 | Hanssen | Oct. 31, 1950 |